United States Patent

[11] 3,617,037

[72] Inventor Pierre Foch
  Forbach, France
[21] Appl. No. 853,580
[22] Filed July 2, 1969
[23] Division of Ser. No. 557,414, June 14, 1966, Pat. No. 3,315,381.
[45] Patented Nov. 2, 1971
[73] Assignee Charbonnages De France
  Paris, France

[54] HEAT TREATMENT OF SLUDGES
  2 Claims, 1 Drawing Fig.
[52] U.S. Cl. .................................................. 263/21, 34/57
[51] Int. Cl. .................................................. F27b 15/00
[50] Field of Search .......................................... 263/21 A; 34/57 A

[56] References Cited
  UNITED STATES PATENTS
2,650,084 8/1953 White .......................... 263/21 A
3,022,989 2/1962 Pyzel .......................... 263/21 A Primary Examiner—John J. Camby
Attorney—Karl W. Flocks ABSTRACT: Apparatus for the heat treatment of partially combustible products in the form of a liquid or pasty sludge including a fluidization reactor having a lower fluidization zone and an upper treatment zone, a distributor grid below the fluidization zone, means for introducing an oxidizing fluidizing agent beneath said distributor grid at a constant flow rate and through said distributor grid to said fluidization zone, means for feeding said combustible products to be treated into the upper portion of said treatment zone from the top, means for introducing into said fluidization zone an inert material of larger granular size than the size of said combustible products, means for introducing a separate fluid over said fluidizing reactor and immediately beneath said fluidization zone, which separate fluid is adapted to maintain the temperature of the fluidized layer of inert material at a valve to insure calcination of at least part of said combustible products, means for regulating the flow rate of the combustible products, and means for removing combusted material from the upper portion of said fluidization reactor.

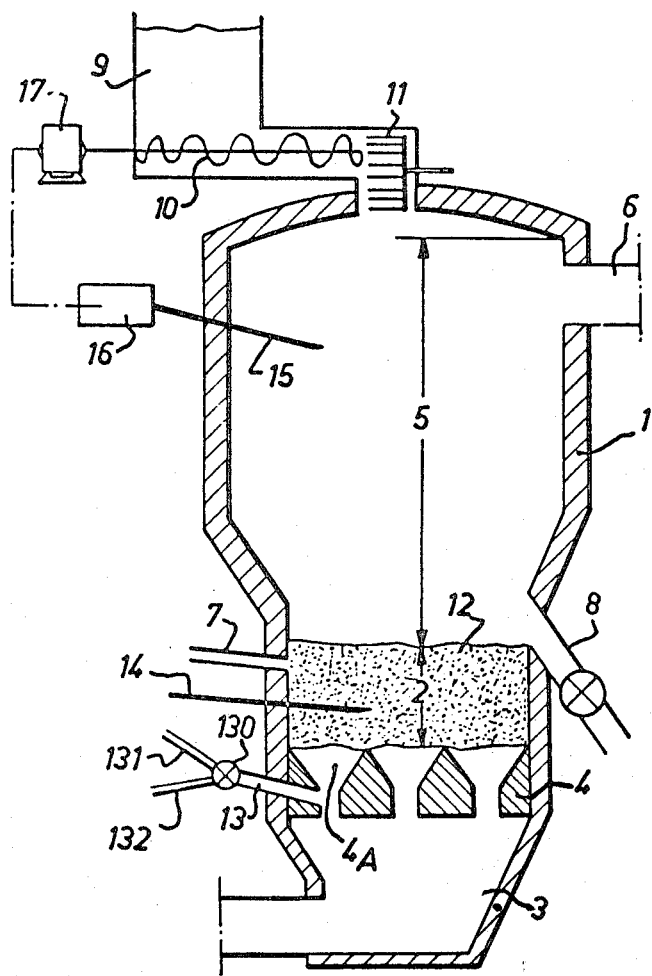

HEAT TREATMENT OF SLUDGES

This is a division of application Ser. No. 557,414, filed on June 14, 1966. In order to apply heat treatment to very fine solids, it has long ago been proposed to treat these products in an auxiliary fluidized layer.

Descriptions have already been given of methods of heat treatment in an auxiliary fluidized layer of more or less combustible fine solids which present themselves in the form of sludges or pastes.

In their principle, these methods consist in introducing the product to be treated into a fluidized layer of material having a larger granular size than that of the fine solids to be treated. This auxiliary fluidized layer has a number of functions: it has simultaneously a heat function as a reserve of heat, a mechanical function of dispersion and a physical function of filtration.

Now, when efforts are made to effect the combustion of a fine combustible by means of this method and it is tried, which is normal practice in any operation of combustion, to reduce the excess air of combustion, it is found that part of the combustion takes place above the fluidized bed, which makes it necessary to choose special devices appropriate to be adapted to this situation.

In more general terms, it is found that all the measures which can be taken to regulate the supply of product to be treated, the supply of supplementary fuel, the supply of combustion-supporting fluid, the supply of cooling fluid and the supply of fluidizing agent are not equivalent from the point of view of the results which can be obtained during the course of a treatment of this kind.

All the methods already proposed have the drawback of varying the flow-rate of fluidizing agent, which may be prejudicial to the satisfactory operation of the installation.

All the methods of regulation proposed act simultaneously on the flow-rate of the fluidizing agent, on the flow of the sludges introduced, and on the flow of the supplementary combustible when this latter is necessary. These methods of regulation are very complicated and adapt themselves badly to large variations of the characteristics of the sludges introduced.

The present invention provides devices for permitting at the same time a combustion with a small excess of air, which is thus economical, easy regulation and stable operation irrespective of the variations of the characteristics of the product to be treated thermally.

The apparatus described thus relate to the treatment by combustion of a sludge or of a partly combustible product previously conditioned in the form of a more or less liquid or pasty sludge.

The operation of the apparatus according to the invention consists of introducing a sludge to be treated, while dispersing it, into a fluidized layer of inert particles traversed by a constant quantity of an oxidizing fluidizing agent, of maintaining the temperature of the said fluidized layer of inert particles at a constant value sufficient to ensure the combustion of the product to be treated and to maintain, by means of regulation of the speed of introduction of the said product to be treated, the temperature of the zone located above the fluidized layer at a constant value, at least equal to that of the fluidized layer but less than the sintering temperature of the ash formed.

In accordance with a characteristic feature, the temperature of the fluidized bed is kept constant by means of a fluid separate from the fluidization agent, and which is injected over the whole section of the chamber and immediately under the fluidized layer.

In accordance with other characteristics:

The temperature of the fluidized layer is maintained at 800° C.;

The temperature of the zone located above the fluidized layer is maintained at 900° C.;

The fluid separate from the fluidization agent, injected immediately beneath the fluidized layer, is a combustible substance;

The fluid separate from the fluidization agent injected immediately beneath the fluidized layer is a vaporizable, nonoxidizing liquid;

The product to be treated is introduced after dispersion into the upper part of the zone located above the fluidized layer of inert particles.

The invention is directed to the apparatus which carries the above-described operation into effect.

Generally, these apparatus comprise:

Means for introducing a constant quantity of fluidization agent, generally air, beneath the fluidized layer;

Means for introducing, while dispersing them, the products to be treated;

Means for injecting either a combustible or a gaseous or vaporizable, nonoxidizing fluid over the whole section of the fluidization chamber and immediately below the fluidized layer; and Means for regulating the flow rate of the products to be treated, as a function of the temperature of the zone located above the fluidized layer.

In accordance with other characteristic features:

The means for introducing the products to be treated, while dispersing them, are constituted by a conveyor screw delivering into the interior of a rotating squirrel cage, mounted in the upper part of the zone located above the fluidized layer;

The distributor grid for the fluidizing agent is constituted by a thick refractory plate pierced with holes having the form of truncated cones or inverted pyramids which are extended, when so desired, by a cylindrical portion at their lower part, the injection of additional combustible or vaporizable fluid being effected either in the cylindrical portion or in the bottom parts of the truncated cones or pyramids of all or part of the said holes.

The invention will be more clearly understood by making reference to the description which follows below in respect of the accompanying drawing which represents in a diagrammatic manner one preferred form of construction of the device in which is effected the calcination of the fine combustible products contained in a sludge, a liquor or a paste.

The apparatus is constituted by a fluidization reactor 1 which comprises, in the usual manner:

A fluidization zone 2 put into communication with the air box 3 through the distributor grid 4 of the fluidizing agent;

A treatment zone 5 provided at its upper portion with an evacuation conduit 6.

There is introduced into the fluidization zone an inert auxiliary solid having a granular size greater than that of the combustible solid to be calcined.

The auxiliary solid may be introduced, either once and for all or in a discontinuous manner by means of the conduit 7 or in a continuous manner with lateral extraction at 8.

The fine solid to be treated which, as has already been stated, may be in suspension in a liquor or may take the form of a sludge or paste, is stored in the hopper 9 and introduced into the fluidization reactor by means for example of a screw 10 discharging at the top of the treatment zone 5.

According to a characteristic feature of the invention, the product introduced into the treatment zone is dispersed by a kind of rotating squirrel cage 11 arranged in such manner that the whole of the product passes through this cage before reaching the treatment zone proper, and is finely dispersed.

The dispersed product is then introduced into the fluidized layer 12 of coarse auxiliary solid, maintained at a temperature T sufficient to ensure the combustion of the fine solid.

The fluidization of this layer is effected by means of a fluidizing agent constituted by cold or preheated air, superoxygenated or mixed with combustion gases when so required.

The whole of the air necessary for the combustion of the combustion fine solid is blown underneath the grid.

Its flow rate is kept at a constant value, which ensures that the chosen conditions of fluidization will always be maintained if the temperature T of the fluidized layer is itself held constant.

It is known that, in all devices for combustion in an auxiliary fluidized layer, to the extent to which it is desired to subject the product during the course of combustion to temperature conditions which are approximately constant and to which it is desired to avoid awkward adjustments, it is in most cases necessary, either to introduce a topping-up or supplementary combustible or to have available a cooling means.

According to a known principle, this very effective cooling means consists of introducing liquid water which is vaporized inside the apparatus.

However, all points of introduction of the supplementary combustible or of the water are not equivalent.

The method recommended consists of introducing either the supplementary combustible or the water over the whole section of the fluidization zone, and immediately beneath the fluidized layer 12. This method has the effect of permitting uniform distribution of the combustible or vaporized water in the fluidization agent, and over the whole section of the fluidized bed.

According to a characteristic feature of the invention, the grid 4 is constructed in the form of a thick refractory plate pierced with holes 4A having the shape of inverted truncated cones or pyramids terminated, if desired, in the lower portion by a cylindrical part so as to permit the intake of fluidizing agent.

The supplementary combustible and/or the water is introduced at 13 into all or part of the holes, either in the cylindrical portion or in the lower part of the truncated cones or pyramids.

The choice of fluid injected at 13 into the grid is made in consideration of the temperature existing in the fluidized bed 12 and supervised by means of a thermocouple 14. When this temperature substantially exceeds a predetermined value, water is introduced by means of the conduit 131, connected to 13 by a double-intake gate valve 130. When the temperature of the fluidized layer becomes substantially less than the predetermined temperature, a combustible is introduced through the conduit 132 connected to the second inlet of the valve 130.

The choice of the nature of the fluid injected into the grid 4 can be made either automatically by means of an electrical signal furnished by the thermocouple, or else manually as a function of the value indicated on the dial of a meter connected to the thermocouple 14.

In this manner, in regards the combustible, this is almost entirely burned before reaching the fluidized layer. In this way, the danger is avoided of seeing combustion of the said combustible substance taking place above the fluidized bed, which would interfere with the satisfactory operation of the regulation adapted, to which reference will be made in the text which follows.

It will be noted that the conditions of temperature in the fluidized bed are maintained in such manner that the combustion may take place there. It will therefore generally be necessary to exceed a temperature T of 750° to 800° C.

The temperature T' of the treatment zone is kept at a value higher than that of the fluidized bed, but it is however lower than the sintering temperature of the ash which leaves the said fluidized bed.

The temperature will be maintained for example in the vicinity of 900° C. It has been seen that these conditions of temperature (T'>T) correspond to operation with a relatively small excess of air, which is eminently desirable for obvious reasons of economy.

The maintenance of the temperature T' at the selected value is ensured by admitting more or less of the product to be treated into the top of the treatment zone.

If the temperature T' increases, this indicates that all the product to be treated which has been introduced has not been completely calcined in the bed, and that the combustion is continuing in the treatment zone. The rate of introduction of the products to be treated is then reduced.

If the temperature T' decreases, this indicates the reverse state of conditions, and the rate of introduction of the solids to be treated is increased.

To this end, a thermocouple 15 supplies an electric signal which represents the temperature of the treatment zone and, through the intermediary of a control circuit 16, acts on the variable speed driving motor 17 of the conveyor screw 10, in such manner that when T' exceeds a preadjusted threshold, the screw rotates less rapidly and vice versa.

It is obvious that the automatic control circuit 16 may be replaced by a simple dial indicator and/or warning device for temperature, the regulation of the driving speed of the screw 10 being effected manually.

It can therefore be seen that the regulation adopted only acts on one of the parameters of the installation, which can only facilitate either its manual operation or it automation.

To sum up, the product to be treated is practically entirely burned in the fluidized bed and all the properties of fluidized layers are thus retained, especially as regards the uniformity of the temperatures.

The regulation and the arrangements adopted ensure a continuous and reliable operation of the installation.

In fact, the quantity of air injected being kept constant together with the temperature of the fluidized layer, and taking account of the very close values of the smoke producing and fuel consuming power, the volume of the combustion gases leaving the fluidized bed is constant in time, which implies a constant speed of the gases passing through the fluidized layer. The fluidization of the bed 12 is therefore not influenced by the variations in the characteristics of the product to be treated.

By adopting the system of regulation according to the invention, it has been possible to calcine sludges with an excess of air of 20 percent (2 to 3 percent of oxygen in the dry combustion gases at the outlet of the installation) and to completely exhaust the combustible contained in the sludges. It has been possible to retain this regulation, even with considerable variations of the calorific power (50 percent) which resulted from the fact that it became necessary to stop the injection of supplementary combustible and to proceed to inject cooling water. The temperatures T and T' were respectively 800° and 900° C.

It results from the above description that at least for certain materials (for example, materials introduced in the form of paste, the treatment of which necessitates an addition of external fuel), the use of the whole of the arrangements and regulations described is essential, the elimination of one rendering the other inoperative.

It will of course be understood that the present invention has only been described and illustrated purely by way of explanation and not in any limitative sense, and that modifications of detail may be made thereto in accordance with its spirit without thereby departing from the scope of the said invention.

I claim:

1. An apparatus for the heat treatment of partially combustible products in the form of a liquid or pasty sludge, comprising:

a fluidization reactor having a lower fluidization zone and an upper treatment zone;

a distributor grid located immediately below said fluidization zone;

means for introducing an oxidizing fluidizing agent wholly beneath said distributor grid at a constant flow rate, and then therethrough to said fluidization zone;

means for feeding said combustible products to be treated, into the upper portion of said treatment zone from the top thereof;

means for introducing into said fluidization zone an inert material having a granular size larger than that of the combustible products to be treated;

means for introducing a fluid distinct from said fluidizing agent over the whole section of said fluidizing reactor and immediately beneath said fluidization zone, said fluid being adapted to maintain the temperature of the fluidized layer of inert material at a constant value sufficient to ensure the calcination of at least part of said combustible products to be treated;

means for regulating the flow rate of that combustible products to be treated as a negative function of the temperature existing in said treatment zone, the temperature existing in said treatment zone being maintained at a constant value at least equal to that of the temperature of the fluidized layer of inert material, but less than the sintering temperature of the ashes formed during the course of treatment; and means for removing combusted material from the upper portion of said fluidization reactor.

2. A heat treatment apparatus as claimed in claim 1, in which said means for introducing, over the whole section of the fluidization reactor and immediately below the fluidization zone, a fluid distinct from the fluidizing agent are constituted by a distribution grid formed by a thick refractory plate pierced with holes, the longitudinal section of which have substantially the form of a Y, the injection of said fluid distinct from the fluidizing agent being effected in the lower half of at least a certain number of said holes which serve for the passage of said fluidizing agent.

* * * * *

UNITED STATES PATENT OFFICE
CERTIFICATE OF CORRECTION

Patent No. 3,617,037     Dated November 2, 1971

Inventor(s)     Pierre FOCH

It is certified that error appears in the above-identified patent and that said Letters Patent are hereby corrected as shown below:

In column 1, line 6, the correct patent number should read as follows:

Pat. No. 3,515,381.

Signed and sealed this 11th day of April 1972.

(SEAL)
Attest:

EDWARD M. FLETCHER, JR.
Attesting Officer

ROBERT GOTTSCHALK
Commissioner of Patents